March 10, 1959     A. O. PALMER     2,877,372
GAS-FILLED THYRATRON

Filed June 22, 1954     3 Sheets-Sheet 1

INVENTOR
ALBERT O. PALMER
BY John C. Dorfman
ATTORNEY

March 10, 1959     A. O. PALMER     2,877,372
GAS-FILLED THYRATRON

Filed June 22, 1954     3 Sheets-Sheet 2

INVENTOR
ALBERT O. PALMER
BY
ATTORNEY

March 10, 1959

A. O. PALMER 2,877,372

GAS-FILLED THYRATRON

Filed June 22, 1954

INVENTOR:
ALBERT O. PALMER
BY
ATTORNEY

United States Patent Office 2,877,372
Patented Mar. 10, 1959

2,877,372
GAS-FILLED THYRATRON

Albert O. Palmer, Stamford, Conn., assignor to Machlett Laboratories, Incorporated, Springdale, Conn., a corporation of Connecticut Application June 22, 1954, Serial No. 438,383

5 Claims. (Cl. 313—242)

This invention relates to a novel gas filled thyratron structure and particularly concerns the anode and grid and the supports for these electrodes. More specifically, this invention concerns rugged supporting structures for thyratron elements which will permit sturdy support of these elements without danger of excessive gas leakage.

In thyratron structures as in other electron tubes it is desirable to retain the various tube elements in their initial position throughout the life of the tube despite rough handling of the tube and the effects of high temperature and other peculiar conditions encountered within the tube structures. Nevertheless, the prior art thyratron structures have often consisted of flimsy constructions which have permitted relative movement of one tube element with respect to another. More specifically, the anodes of prior art thyratrons have often been supported merely on a single rod support conductor despite the relatively large radius of the disk-like anode electrode. Another example of undesirable structural practice in thyratrons has been the use of clamping means to hold the grid structure relative to the anode. Such non-permanent means of affixing one electrode with respect to another may permit a shift in the relative positions of the electrodes and, hence, a change in characteristics of the tube.

The present invention seeks to alleviate the problem of flimsy or insecure support by substituting securely mounted, rugged support structures for the inadequate support members. It, furthermore, makes it possible for the support to be of a permanent nature because of the strong permanent joints between all portions of the support structure, including particularly glass-to-metal seals between metallic supports and glass envelope and support members.

The use of ring seals between tubular glass and metal portions of the tube structure is not as simple an expedient as it might at first seem to be. Early experimenters in the art found that common glass sealing metals such as alloys of iron, nickel and cobalt had a tendency to form seals which permitted the penetration of gases, such as hydrogen, particularly during the times when the gases used were energized and ionized. Accordingly, if glass-to-metal seals are not carefully located, the gas or gases filling the envelope will tend to diffuse through the glass-to-metal seals and the change in pressure within the tube will cause a change in tube characteristics.

In accordance with the present invention, glass-to-metal seals are made between the metallic and glass support structures either internally of the envelope so there is no danger of leakage, or in a remote portion of the envelope at such a location that the leakage will be greatly minimized. More specifically, a grid support is provided by a flange of suitable metal for sealing to glass which is joined to a neck which extends into the vacuum envelope and forms no part of the vacuum wall. This neck and the envelope portion to which it is joined advantageously are close spaced to the anode support structure throughout its length.

The present invention concerns particularly a novel type of anode support arrangement which is structurally sturdier than rod-type anode supports of the prior art and which is also able to afford much larger cooling area for disposing of the anode heat outside of the vacuum envelope.

The anode of the present invention is supported upon a tubular metal support. This tubular metal support is in good contact with the anode and preferably one end is closed by the anode or its supporting structure. The other end of the tubular support, however, is glassed to the vacuum envelope in such a manner that the inside surface of the tubular member is exposed to the atmosphere for cooling. In other words, the tubular support member for the anode forms a reentrant portion of the vacuum envelope.

The dielectric portion of the vacuum envelope which is affixed to the end of the tubular support member opposite the end which supports the anode is so arranged that either it or its extension is doubled back around the tubular anode support and kept close spaced to said support. In the usual construction, part of the close spaced dielectric member extending between the anode and the grid is a neck-like extension of said vacuum envelope. This neck-like extension of the vacuum envelope is sealed to a tubular grid support flange within the envelope. This flange is advantageously composed of suitable metal for sealing to the dielectric neck.

For a better understanding of this invention reference is made to the following drawings.

Figure 1:
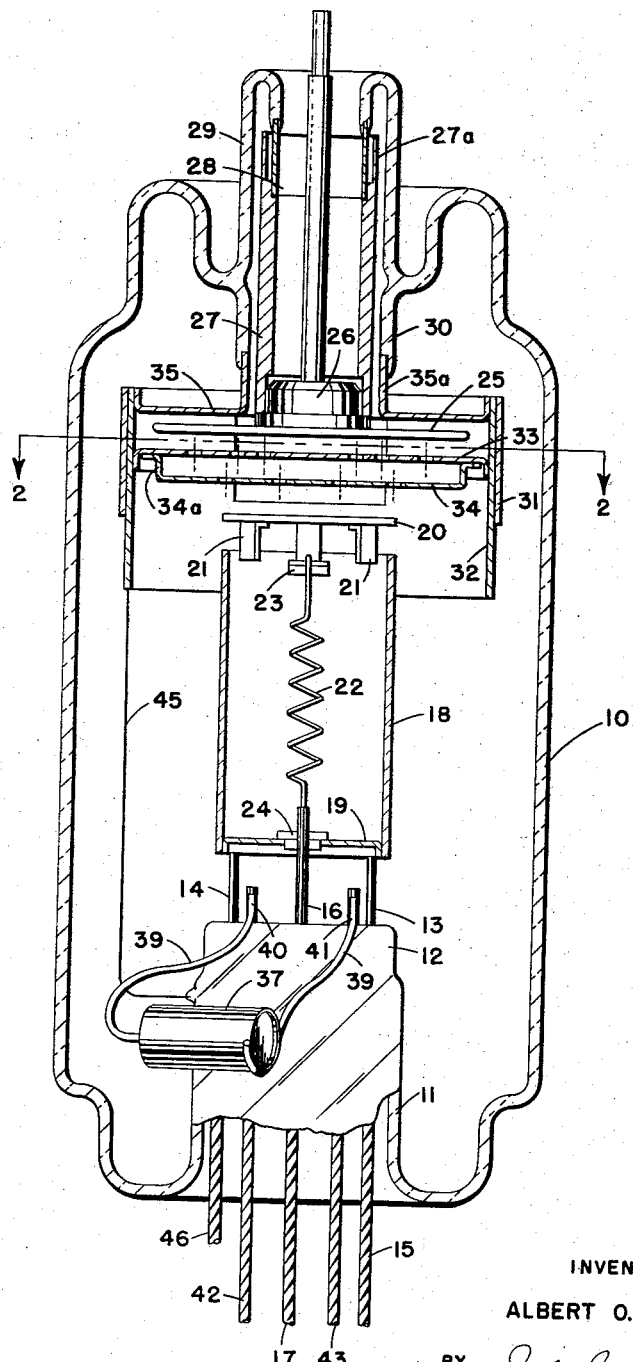
Fig. 1 illustrates in section an electron tube of the hydrogen thyratron variety which employs a planar anode and grid arrangement with the support structures of the present invention.

Referring to Fig. 1 the electron tube illustrated is a thyratron which has a vacuum envelope generally designated 10 which is filled with a low pressure gas, such as hydrogen. Closing one end of the vacuum envelope is a reentrant portion 11 terminated in stem press 12. Embedded in this stem press are cathode support rods 13 and 14. Rod 13 serves as an electrical connection for the cathode and as a lead-through into the vacuum envelope. Externally of the vacuum envelope it is connected to flexible lead 15. Electrically speaking, the other side of the cathode is connected to rod conductor 16 which penetrates the vacuum envelope and is terminated externally of the envelope in flexible lead 17. The cathode structure, which is schematically represented, is advantageously composed of a tubular or cylindrical element 18 mounted on support rods 13 and 14. The internal surface of tubular member 18 is coated with an oxide type emitter material. The supported end of the tubular cathode member 18 is advantageously closed by a disk-like member 19. Its other end is partially closed by disk-like baffle member 20 which may be supported on metallic tabs 21. The heater element 22 is of helical form and is advantageously made to extend coaxially within tubular cathode member 18. This heater element may be supported at one end on a metallic tab member 23, which is affixed to baffle member 20, and at the other end on support conductor 16 which extends through disk wall 19 from which it is insulated by insulator 24.

The other end of the electron tube is closed by the anode and grid structures which are supported on the vacuum envelope in some convenient manner. The anode 25, in this instance, is a heavy disk-like member, preferably composed of some refractory metal like molybdenum. A metallic block 26 is affixed to one side of the anode. This block 26 is of cylindrical form and has a cylindrical surface which accepts and closes one end of heavy tubular member 27 to which it is affixed vacuum tight in some convenient manner, as by brazing. Tubular member 27, which may be composed of material like certain ferrous alloys, which are moderately good conductors of heat but not sufficiently good to cool the anode below the temperature where it operates efficiently. Tubular member 27 is advantageously sealed to the glass envelope member 29 using collar 28 which is composed of an appropriate glass-sealing metal. Tubular extension 27a is advantageously made to extend around the metal-to-glass seal so as to shield said seal against bombardment or discharge effects between anode and grid.

The portion 29 of the vacuum envelope which is sealed to collar 28 is folded back on itself to form a tubular section which closely approaches and surrounds the tubular anode support 27. The length of this dielectric vacuum envelope wall portion may vary from tube to tube. However, in each instance, when section 29 is terminated, a dielectric neck-like extension 30 of the vacuum wall is advantageously employed to provide a continuous close spacing between the dielectric wall and the anode support member. This tubular dielectric neck or extension 30, in turn, provides support for the grid. The grid potential structure is advantageously a flat, cylindrical, can-like structure which surrounds and is close spaced to the anode structure. The cylindrical side walls of the can are provided by screen member 31 and solid tubular member 32 arranged so that member 32 extends well below the bottom of the grid can structure and below the level of the open end of the tubular cathode member 18. The side wall of the grid can is left partially open (i. e. closed only partially by the screen) to permit equalization of pressures both inside and outside the can.

Figure 2A:
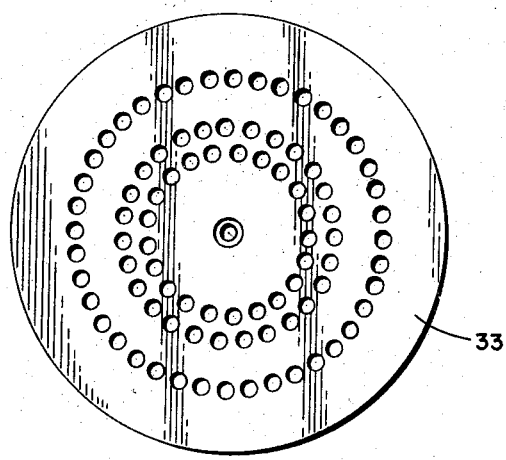
Figs. 2a and 2b show plan views of the perforated grid assembly members as they would appear from a position corresponding to line 2—2 in Fig. 1.
Figure 2B:
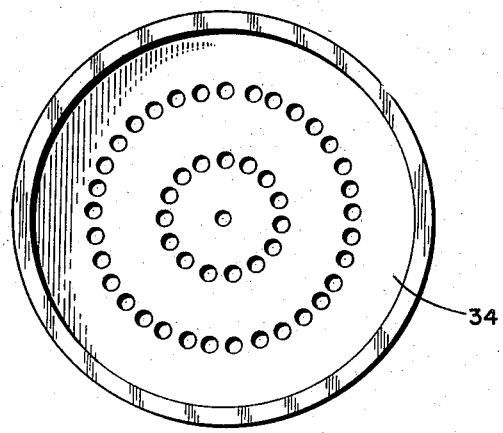

The nature of the active grid may be seen in Figs. 2a and 2b. Member 33 shown in Fig. 2a is a perforated disk-like member which is advantageously placed close to the anode. This grid member in itself would be sufficient for many thyratron applications. However, in order to give better control over the firing of the thyratron, an additional grid or baffle structure 34, shown in Fig. 2b, is employed and is separated from grid 33 by its own cylindrical rim structure 34a. The degree of control of firing is quite high because the perforations in disks 33 and 34 are offset from one another. By the same token a large anode voltage is required to fire the tube. The other end wall of the can-like grid structure is closed by annular wall member 35. At the inner edge of annular member 35 is a grid cylinder flange 35a which provides the support for the grid structure at the junction between the grid can and the dielectric neck 30. As shown in Fig. 1, if the surface opposite the anode support 27 provided by dielectric neck 30 and flange 35a is smooth, or, better, if the dielectric insulates the edge from the anode, the opportunity for erratic breakdown between the grid and the anode support is minimized. This is so because it reduces the flux lines concentration at the edge of the metallic member which would otherwise cause the gradient to be high. Then, flux lines tend to crowd into the dielectric neck 30 rather than in the inner space between the wall formed by neck 30 and flange 35a and the anode support 27.

It is also possible to employ a gas generator within this vacuum envelope to maintain the gas pressure at the required level for proper ionization. In this instance the gas generator 37 is of the novel type described in my U. S. patent application Serial Number 404,967, filed January 19, 1954, now Patent No. 2,804,563. This generator may be excited by an electric current passed through it and through support leads 38 and 39 which are on support conductors 40 and 41. Support conductors 40 and 41 penetrate the stem press 12 and are terminated externally of the vacuum envelope in flexible leads 42 and 43, respectively.

Potential may be supplied the grid structure by lead 45 which penetrates the vacuum envelope at press 12 or adjacent thereto. Outside of the envelope the lead 45 is attached to flexible lead 46.

Figure 3:
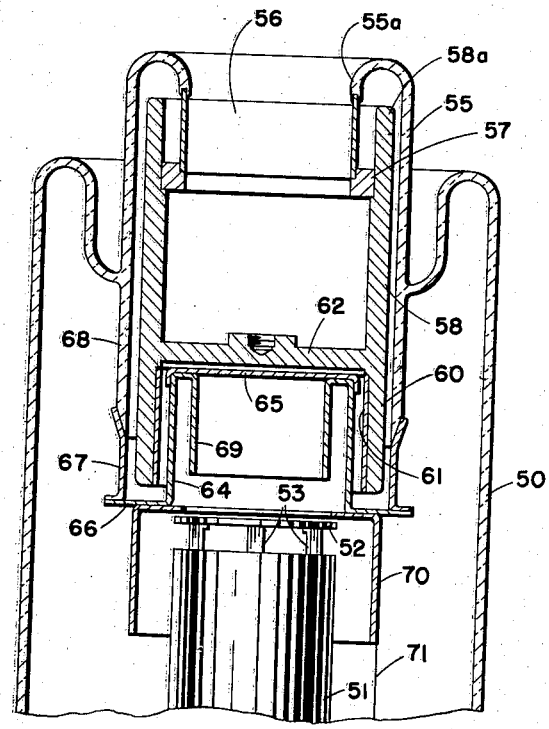
Fig. 3 illustrates in section a modified version of an electron tube employing the present invention in which a cylindrical anode and grid arrangement is employed.

Referring now to the structure of Fig. 3, only part of the tube structure is shown. The envelope 50 corresponds in general shape and size to the envelope structure as shown in Fig. 1. The cathode 51, which may be essentially like the cathode of the Fig. 1 version, is shown in elevation with its baffle member 52, which partially closes the open end of cathode structure 51. Baffle 52 is supported upon three tabs 53 which keep it at the desired spacing from the end of the cathode cylinder.

The end of the envelope supporting the anode is closed in a double reentrant portion 55. This double reentrant portion is terminated in dielectric lip portion 55a which is sealed to glass sealing collar 56 which supports the anode structure. In this instance, the glass sealing collar does not directly support the anode support member. Instead, it is sealed to ring 57 which is, in turn, sealed to heavy tubular support member 58. Member 58, as in the Fig. 1 version of the invention, is advantageously composed of a ferrous alloy. This construction keeps the glass-to-metal seal further removed from the support member 58 than in the Fig. 1 version, thus protecting it from overheating due to the heat conducted away from the anode. The end of support 58 in this case provides shield portion 58a. This shield portion 58a serves, as did the shield in the Fig. 1 version of the invention, to protect the seal between lip 55a and collar 56. It also shields the collar 56 which is more permeable to gases filling the tube than the dielectric envelope portions and accordingly makes it less likely for gases, particularly ionized gases, to escape through this member.

The anode 60 is itself advantageously a direct extension of the tubular support member 58. The anode may have its internal cylindrical face covered by a sheet metallic surface member 61 of some refractory metal or other material better suited to accept direct bombardment than the material of the support member. The vacuum barrier between the inside and the outside of the tube in this case is a lateral wall 62 within tubular member 58, which wall is preferably just above the active anode surface 61.

The active grid element, in this instance, is a perforated tubular or cylindrical member 64 having its perforations directly opposite active anode surface 61. The ends of this active grid member, like the grid itself, are close spaced to the anode potential structure. In this case member 65 is a cap-like member fitting atop tubular member 64 and lying adjacent lateral wall 62 of the anode structure. The end of the anode structure 60 is close spaced to the active grid structure which has an outward extending annular flange 66 which is advantageously an integral part of active grid member 64. To this flange 66 is affixed tubular member 67 which closely embraces the bottom portion of the tubular anode member 60 from its junction with flange 66 to its junction with dielectric neck 68. Tubular member 67 is a grid supporting flange and advantageously has its edge, which is sealed to the glass, flared away from the anode so that a flux concentration will not build up at its end adjacent the anode structure to cause breakdown. It will be noticed that the junction between grid-sealing flange 67 and dielectric neck portions 68 is entirely within the vacuum envelope so there is no danger of gas leakage outside of the vacuum envelope at this junction. A skirt 70 for deionization purposes is made to extend from flange 66 downwardly, and it surrounds cathode structure 51. A grid lead 71 is provided which may be conveniently attached to a lead-in connection through the same stem press, through which press cathode leads are also introduced into the gas filled envelope.

The assembly of the structures of the present invention is of a conventional nature and differs from the assembly of prior art tubes only in minor respects which will prove no obstacle to those skilled in the art.

The operation of the tubes of the present invention is also of a conventional nature, wherein the tube is fired by applying a voltage pulse to the grid structure in order to trigger the conduction within the particular tube.

Modifications of the structure described within the scope of the claims will occur to those skilled in the art. All such modifications are intended to be within the scope and spirit of this invention.

I claim:

1. A hydrogen thyratron tube comprising a gas-tight envelope consisting of a glass portion and a metal portion, said glass portion including a bulb having an opening at one end and an outwardly extending hollow neck encircling the opening and an inwardly extending tubular support coaxial with the neck, a control electrode mounted within the bulb on the inner end of said tubular support, and cathode and anode electrodes within the envelope, said metal portion of the envelope consisting of a tubular member of metallic material impervious to the gas in the envelope at tube operating temperatures and lying within the opening in the bulb, said tubular metal member having one end sealed to the neck outwardly of the opening and having its other end sealed to the anode inwardly of the opening and having its internal surface exposed to atmosphere external to the tube for dissipation of heat directly to said atmosphere, the unexposed surface of the tubular member lying within and in close spaced relation to said neck and support.

2. An electron tube substantially as set forth in claim 1 wherein the control electrode is a disclike grid extending between the anode and cathode and encircled and supported by a canlike structure, said structure embodying an annular member sealed to the tubular support.

3. An electron tube substantially as set forth in claim 1 wherein the control electrode comprises a tubular grid located in predetermined spaced relation to and within the hollow cylindrical effective anode provided by the inner portion of the tubular member, and an annular connecting member connecting the tubular grid to the tubular support of the envelope.

4. An electron tube substantially as set forth in claim 1 wherein the anode comprises an effective anode disc extending transversely of the envelope and an anode block mounted on the surface of the anode disc nearest the tubular metal member and sealed to said tubular member for support thereby.

5. An electron tube substantially as set forth in claim 4 wherein a metal electrical conductor is connected at one end to the anode block and extends outwardly of the tube through the tubular metal member and neck for connecting the anode to a suitable source of electrical potential external of the tube.

References Cited in the file of this patent

UNITED STATES PATENTS

| | | |
|---|---|---|
| 1,949,347 | Bouwers | Feb. 27, 1934 |
| 2,411,523 | Chevigny | Nov. 26, 1946 |
| 2,415,349 | Harries | Feb. 4, 1947 |
| 2,469,331 | Eitel | May 3, 1949 |
| 2,644,101 | Watrous | June 20, 1953 |